Sept. 4, 1951 K. E. BEMIS 2,566,651
ICE CREAM SOFTENING APPARATUS
Filed Jan. 24, 1950
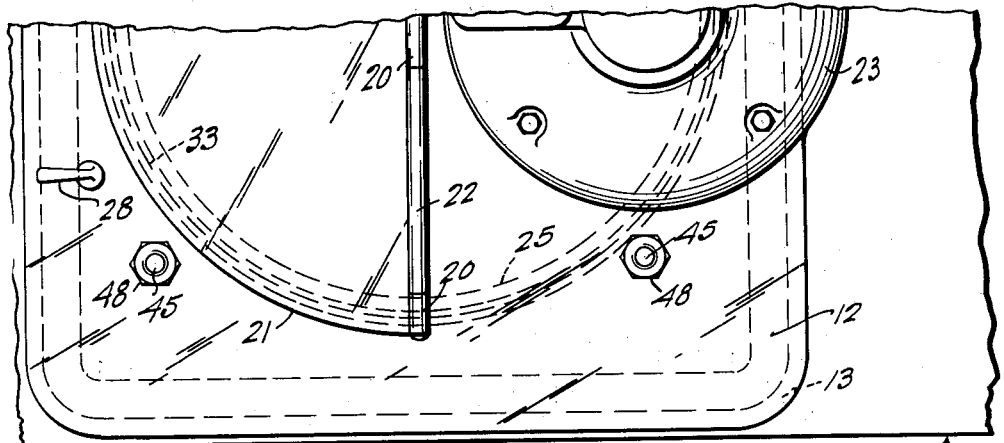
Fig. 1
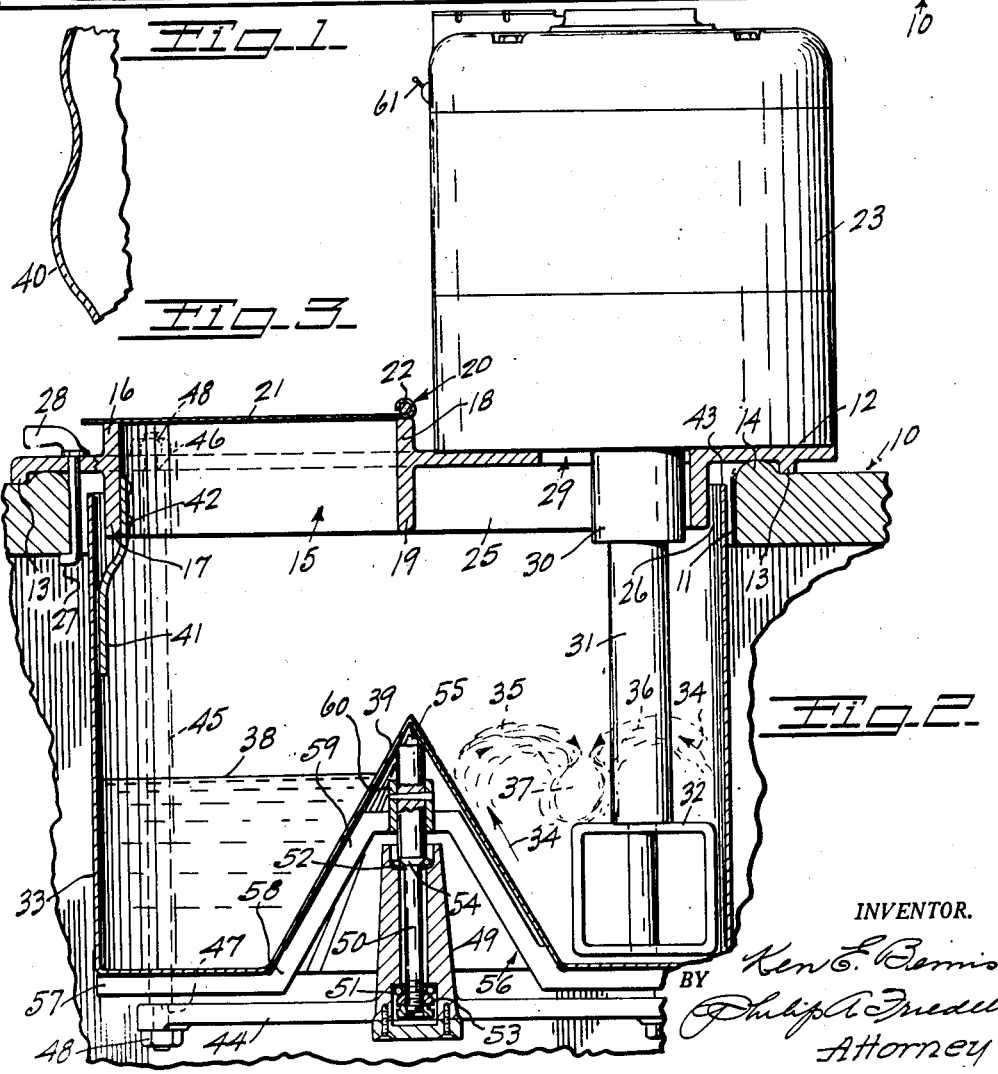
Fig. 3
Fig. 2
INVENTOR.
Ken E. Bemis
BY
Philip A. Fredell
Attorney

UNITED STATES PATENT OFFICE 2,566,651

ICE-CREAM SOFTENING APPARATUS

Ken E. Bemis, Oakland, Calif.

Application January 24, 1950, Serial No. 140,220

3 Claims. (Cl. 259—85)

This invention relates to improvements in mixing and beating apparatus and particularly to ice cream softening apparatus for changing ordinary well frozen ice cream to a semi-fluid state through the addition of a liquid such as milk or cream in small amount coupled with thorough mixing, beating and stirring.

This invention provides a sanitary combination beater and mixer, and dispensing container, and is so constructed and operated as to permit dispensing the softened ice cream while the apparatus is in operation. It beats and whips the well frozen ice cream into a semi-fluid mass while simultaneously aerating the ice cream to increase the volume, and operates in such manner as to thoroughly beat all of the ice cream in the container and subject it to aeration, thus increasing the bulk as much as 100% with continued beating over an extended period, through an increase of about 50% in volume is most suitable and provides the most palatable product.

The container is pivotally supported, and the beater is motor driven at high speed. The beater with its motor is instantly removable at will, and the container is removable by merely removing a few screws or nuts; a quick-acting type of nut being preferable for speed of removal.

The container is provided with an axially located conical center pillar which extends upwardly to about one-half the height of the container and functions simultaneously to feed the ice cream back to the beater, and to provide a guard for the opposite side for safe dispensing of the softened ice cream while the apparatus is operating, and the beater extends upwardly to only about half the height of the pillar so that the overfeed from the pillar will close over the beater and entrap air; and the container preferably has vertically corrugated walls for increasing the speed of rotation of the container on its pivot, which rotation is induced by the beater through the ice cream to the walls, a single beater being preferred.

The objects and advantages of the invention are as follows:

First, to provide mixing and beating apparatus which will efficiently change ice cream from a more or less hard frozen state to a heavy creamy or semi-liquid condition.

Second, to provide apparatus as outlined which will occlude air within the ice cream during the softening process to increase the volume and palatability of the product.

Third, to provide apparatus as outlined with a container having a central conical guard having a height substantially equal to one-half the depth of the container for safe dispensing from one side while overcasting ice cream to the beater on the other side.

Fourth, to provide apparatus as outlined with a container which is pivotally supported in a suspended cradle and rotatably driven by the beater through the contents to the wall of the container.

Fifth, to provide apparatus as outlined with a motor directly connected to the beater and in which the motor and its beater is instantly removable from the container and replaceable at will.

In describing the invention reference will be had to the accompanying drawings in which:

Fig. 1 is a half top plan view of the invention.

Fig. 2 is a sectional elevation through the invention.

Fig. 3 is a fragmentary sectional view through the side wall of the container.

The invention can be mounted in any conventional horizontal freezer, such as an ice cream cabinet 10 and is made to fit in one of the openings 11 with the apparatus supported by a main cover on the top of the freezer as shown, the support comprising a bead 12 having a depending head 13 which rests on the top of the cabinet and spans the bead 14 which is formed about the periphery of the opening 11 and thus seals the cabinet.

This cover has an opening 15 semi-circular in form formed through one side of the cover and has both, an upstanding and a depending peripheral wall respectively 16 and 17 including the transverse walls 18 and 19, the upper end of the wall 18 terminating in a hinge member as indicated at 20, and a cover 21 is hinged to this wall as indicated at 22.

A vertical motor 23 is supported on the other half of the main cover member as shown for quick removal when desired. The wall 17 forms a complete circle as indicated at 25 and is spaced from the walls of the opening 11 as indicated at 26. Locking means 27 is provided for the end farthest removed from the motor and is made to engage under the top of the cabinet as indicated and terminates at its upper end in a lever 28 so that the lock can be turned to release the main cover at will for removal of the entire unit consisting of main cover, motor and beater. An opening 29 is formed in the main cover member for the hub 30 of the motor. The motor has an extended shaft 31 on the lower end of which is mounted a single beater 32 which extends to a median elevation as referred to the conical pillar, and consequently one-quarter the height of the container.

The container 33 has a diameter to operate freely in the space 26 between the depending wall 17 and the periphery of the opening in the cabinet and terminates in a plane between the bottom of the depending wall and the underside of the main cover, and also clears the locking means 27 so that the upper end of the container operates within the annular recess 27.

This container has a combined axial guard and deflector which may be cylindrical in form, but is preferably conical because of greater efficiency in occluding air and because more convenient space is provided for dispensing from the side opposite the beater, and this guard and deflector extends upwardly to a height equal to about half the height of the container. An annular space is formed between the bottom of the guard and the side walls of the container, with a radial width slightly greater than the outside diameter of the beater, just sufficient additional width being provided for good clearance, and the beater has a height equal to about one half the height of the conical pillar or guard so as to create a good feed-back from the guard well over the top of the beater. With these proportionate heights the ice cream is forced upwardly along the cone and the container wall as indicated by the arrows 34, then folds over as indicated at 35 and 36 with the folds overlapping over the beater and forming a hollow pocket as indicated at 37 which opens just ahead of the beater, entrapping air which is then caught by the beater and occluded in the ice cream. At the same time, the softened ice cream at 38 is available for dispensing through the opening 15, with the guard 39 preventing the spoon or ladle used for dispensing from contact with the beater. Thus it is possible to dispense the softened ice cream while the apparatus is in operation.

For some purposes the container should revolve slowly under which conditions the walls are plain cylindrical, but for other materials, such as ice cream faster rotation is desirable and under which conditions the side walls of the container are vertically corrugated with shallow corrugations as indicated in Fig. 3 at 40. Since the beater drives the container through the contained material, the speed of revolution of the container is about doubled when the walls are corrugated.

An anti-climb device is indicated at 41 and is mounted on the main cover as indicated at 42 and extends down to about the ice cream level for maximum content and which is limited to the height of the guard, or one-half the depth of the container because if the container is filled to a higher level it is almost certain to climb up and over the top edge of the container in spite of the anti-climb device, in fact the anti-climb device is effective only so long as it does not extend down to the quiescent liquid level. This device does not touch the wall but clears slightly so as to offer very little resistance to rotation of the container, and merely prevents the material from climbing to any appreciable extent up the walls. Without this device the ice cream or other material would soon climb up the walls and over the edge 43 of the container.

Supporting means for the container consists of a cradle 44 which is suspendedly supported from the main cover by a plurality of bolts 45 which are shouldered as indicated at 46 and 47 to seat on the top of the cradle and underside of the main cover, and secured by suitable nuts 48. This cradle has an upstanding hub 49 in which a pivot shaft 50 is rotatably supported in ball bearings 51 and 52 and maintained against axial movement; the inner race 53 being secured on the lower end of the shaft, and a shoulder 54 on the shaft cooperates with the upper ball bearing, and this shaft terminates at its upper end in a conical pivot end 55 which seats in the apex of the cone 39, thus forming a centering means for the container.

A spider 56 has base arms 57 which terminate in the base 58 of the converging webs 59 which in turn terminate in a hub 60 which is fixed on the vertical pivot shaft 50 below the conical pivot end.

The annular bottom portion of the container rests on the arms 57 while the inside of the apex of the cone rests on the conical point of the shaft, there actually being a very slight clearance between the spider arms and the bottom of the container so as to provide actual seating on the conical end of the shaft.

The motor is controlled by a switch 61. The motor drives the beater at high speed, and the beater, through the contained material, drives the container, thus the beater operates on all of the contents, gradually beating and mixing the contents and causing the entrapment of air and its occlusion in the contents, gradually increasing the bulk according to the time of treatment, increasing the palatability as well as the volume. As will be noted, the motor with its beater can be lifted out at will, the cover with the cradle and container can then be removed, and the container can be removed from the support or cradle merely by removing the nuts 48, and the entire unit can be removed from the cabinet at will by merely turning the keys 28.

I claim:

1. Ice cream softening apparatus for mounting in the access opening in the top of a refrigerating cabinet comprising; a main cover, a cradle rigidly suspendedly supported by said main cover and having an axial upwardly projecting rotatable shaft terminating in a cone point; a spider fixedly secured axially on said shaft; a container having an axial conical combined guard and deflector having a height equal substantially to one-half the height of the container with the inside of the apex of the cone resting on said cone point for accurate centering of the container, said spider having an axial upwardly projecting portion to fit in said axial combined guard and deflector for support of said container, a beater operating in the annular space between said combined guard and deflector and the wall of said container with the top of said beater in a plane coincident with the vertical center of said combined guard and deflector with said combined guard and deflector causing the ice cream to fold over the top of the beater, and means for driving said beater.

2. Mixing and beating apparatus comprising, a container having side walls and a bottom with a cone axially located and extending upwardly and having a height about equal to one-half the height of the container, a beater operating in the annular space between the base of said cone and said side walls, and driving means for said beater, said beater having its top coincident with a median plane through the cone and therefore being equal to approximately one half the height of the cone for feedback from the cone to the beater, a pivotal support for said container and support means for suspendedly supporting said pivotal support and including a cradle having a rotatable vertical shaft having a spider fixedly mounted thereon for rotatably supporting said container 3. Ice cream softening apparatus comprising a container having side walls and a bottom, and an axial inverted conical combined guard and deflector projecting upwardly from said bottom and having a height substantially equal to one-half the height of the container, a cradle and support means therefor and having an upwardly projecting axial hub, and a shaft rotatable in said hub and projecting thereabove, a spider having an axial inverted conically formed axial hub fixed on said shaft and fitting within said combined guard and deflector for support of said container and having radial arms for support of said bottom, and a beater having a height substantially equal to one-half the height of said combined guard and deflector and operating in the annular space between said combined guard and deflector and said side walls, and driving means for said beater, with said combined guard and deflector causing ice cream to fold back over the top of said beater and said beater causing rotation of said container through mutual cooperation of the ice cream between the side walls and the beater.

KEN E. BEMIS.

REFERENCES CITED

The following references are of record in the file of this patent:

UNITED STATES PATENTS

| Number | Name | Date |
|---|---|---|
| 228,739 | Durand | June 15, 1880 |
| 593,118 | Pitzler | Nov. 2, 1897 |
| 635,001 | Schoregge | Oct. 17, 1899 |
| 2,003,931 | Gilbert | June 4, 1935 |
| 2,127,777 | Kunzi | Aug. 23, 1938 |

FOREIGN PATENTS

| Number | Country | Date |
|---|---|---|
| 192,395 | Germany | Dec. 12, 1907 |
| 373,356 | France | May 13, 1907 |
| 396,464 | France | Apr. 13, 1909 |